United States Patent

Ikawa et al.

[15] 3,673,234
[45] June 27, 1972

[54] PROCESS FOR PREPARING DIALKYLAMINOALKOXYCARBONIUM TETRAFLUOROBORATE

[72] Inventors: Kenji Ikawa, Osaka; Fumitaka Takami, Higashiosaka, both of Japan

[73] Assignee: Shionogi & Co., Ltd., Osaka, Japan

[22] Filed: April 22, 1970

[21] Appl. No.: 30,932

[30] Foreign Application Priority Data

May 15, 1969 Japan....................................44/37871

[52] U.S. Cl. .......................................................260/453 R
[51] Int. Cl. .........................................................C07c 119/16
[58] Field of Search ....................................260/566 R, 453 R

[56] References Cited

OTHER PUBLICATIONS

Meerwein et al., Justus Leibigs Annalen der Chem., Bd. 641 pp. 2, 3, 22, 23 (1961)
Suydam et al., The Journal of Organic Chemistry, Vol. 34, No. 2, pp. 292–296 (February, 1969)

Primary Examiner—Leon Zitver
Assistant Examiner—Michael W. Glynn
Attorney—Wenderoth, Lind & Ponack

[57] ABSTRACT

Dialkylaminoalkoxycarbonium tetrafluoroborate of the formula:

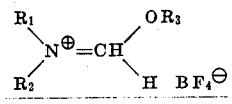

wherein, $R_1$, $R_2$ and $R_3$ each represents a lower alkyl group, is prepared by reacting dialkylformamide and alkyl chloroformate with sodium fluoroborate. Furthermore, dialkylformamide dialkylacetal of the formula:

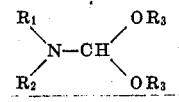

wherein, $R_1$, $R_2$ and $R_3$ are meanings the same meanings as above, is prepared by treating said dialkylaminoalkoxycarbonium tetrafluoroborate with sodium alcoholate.

3 Claims, No Drawings

PROCESS FOR PREPARING DIALKYLAMINOALKOXYCARBONIUM TETRAFLUOROBORATE

BACKGROUND OF THE INVENTION

1. Field of the Invention

The present invention generally relates to a process for synthesizing nitrogen-containing organic compounds. More particularly, the present invention is concerned with novel methods of preparing dialkylformamide dialkylacetal of the formula:

$$\begin{array}{c} R_1 \\ \diagdown \\ R_2 \end{array} N-CH \begin{array}{c} OR_3 \\ \diagup \\ OR_3 \end{array} \quad (I)$$

wherein, $R_1$, $R_2$ and $R_3$ each represents a lower alkyl group, useful as reagents for various synthetic reactions, and dialkylaminoalkoxycarbonium tetrafluoroborate of the formula:

$$\begin{array}{c} R_1 \\ \diagdown \\ R_2 \end{array} N^{\oplus}=C \begin{array}{c} OR_3 \\ \diagup \\ H \end{array} \quad BF_4^{\ominus} \quad (II)$$

wherein, $R_1$, $R_2$ and $R_3$ are as above, an intermediate for the former compounds.

The Compound (I) is commercially important as a raw material since it gives, for instance, dicyanodialkylaminoethylene, an intermediate for cyanopyrimidine, when it is treated with dicyanomethane. On the other hand, the Compound (II) readily gives the Compound (I) by the action of sodium alcoholate in alcohol.

2. Description of the Prior Art

The hithertofore known methods for preparing the Compound (I) or (II) are summarized as follows:

1. A method for first preparing the Compound (II) by treating triethyloxonium fluoroborate with dimethylformamide (DMF), and then obtaining the Compound (I) by treating the Compound (II) with sodium ethylate (H. Meerwein et al., Ann., 641, 1 (1961)).

2. A method of preparing an iminoether of the formula:

$$\begin{array}{c} CH_3 \\ \diagdown \\ CH_3 \end{array} N^{\oplus}=CH \begin{array}{c} OCH_3 \\ \diagup \\ \end{array} CH_3SO_4^{\ominus}$$

by mixing DMF and dimethylsulfate in the first place, and thereafter obtaining the Compound (I) by treating the iminoether with alcoholate (H. Bredereck, et al., Angew. Chem., 73, 493 (1961)).

3. A method of preparing dimethylchloromethyleneammonium chloride of the formula:

$$\begin{array}{c} CH_3 \\ \diagdown \\ CH_3 \end{array} N^{\oplus}=CH \begin{array}{c} Cl \\ \diagup \\ \end{array} Cl^{\ominus}$$

from a mixture of DMF and phosgen in the first step and then obtaining the Compound (I) by treating the chloride with alcoholate (H. Eilingsfeld et al., Chem. Ber. 96, 2671, (1963)).

Of these methods, the first one has a serious objection that the raw material, triethyloxonium fluoroborate, is very expensive and too hygroscopic to allow easy handling. The disadvantage of the second method is a prolonged reaction period, as long as 2 days or more, required for obtaining the intermediate, the imido-ether, accompanied with much heat consumption.

The problems which must be solved for making the third method commercially viable are high toxicity of the raw material, phosgen, and high hygroscopicity of the reaction intermediate, dimethylchloromethyleneammonium chloride. Besides, 2 moles of alcoholate is usually required for the reaction.

SUMMARY OF THE INVENTION

It is therefore the primary object of the present invention to provide a novel method for preparing said dialkylformamide dialkylacetal (I) through dialkylaminoalkoxycarbonium tetrafluoroborate (II), which method wholly or partially obviates the above described drawbacks of and objections to the conventional methods and has solved the above problem. It is another object of the present invention is to provide an economically advantageous method for producing said compounds. These and other objects of the present invention will become apparent to those who are conversant with the art to which the present invention pertains by the following disclosure in the specification and the appended claims.

DESCRIPTION OF THE PREFERRED EMBODIMENT

According to the present invention, there is provided a process for preparing dialkylamino alkoxycarbonium tetrafluoroborate of the formula:

$$\begin{array}{c} R_1 \\ \diagdown \\ R_2 \end{array} N-CH \begin{array}{c} OR_3 \\ \diagup \\ OR_3 \end{array} \quad (I)$$

wherein, $R_1$, $R_2$ and $R_3$ each represents a lower alkyl group, which comprises reacting dialkylformamide and alkyl chlorocarbonate with sodium fluoroborate. Also provided is a process for preparing dialkylformamide dialkylacetal of the formula:

$$\begin{array}{c} R_1 \\ \diagdown \\ R_2 \end{array} N^{\oplus}=C \begin{array}{c} OR_3 \\ \diagup \\ H \end{array} \quad BF_4^{\ominus} \quad (II)$$

wherein, $R_1$, $R_2$ and $R_3$ are as above, which comprises subjecting the Compound (II) prepared as above to the action of sodium alcoholates, optionally after isolation.

The reaction may be carried out at a temperature of from 0° to 30° C, and is usually completed within 2 hours.

The lower alkyl groups will each generally contain no more than four, usually no more than two, carbon atoms.

As described above, the method in accordance with the present invention will produce the Compounds (I) or (II) in good yield with raw materials which are inexpensive, non-hazardous and easy to handle as compared to those utilized in known synthesis, at comparatively low temperature and in a short time.

The possible mechanism of developing the Compound (II) is generally considered to be as follows:

$$\begin{array}{c} R_1 \\ \diagdown \\ R_2 \end{array} N-\overset{O}{\underset{\|}{C}}-H \longleftrightarrow \begin{array}{c} R_1 \\ \diagdown \\ R_2 \end{array} N^{\oplus}=\overset{O^{\ominus}}{\underset{|}{C}}H \xrightarrow{ClCOOR_3}$$

$$\begin{array}{c} R_1 \\ \diagdown \\ R_2 \end{array} N^{\oplus}=CH \begin{array}{c} O \\ \diagup \\ \end{array} C=O \xrightarrow{-CO_2} \begin{array}{c} R_1 \\ \diagdown \\ R_2 \end{array} N^{\oplus}=CH \begin{array}{c} OR_3 \\ \diagup \\ \end{array} Cl^{\ominus}$$

$$\xrightarrow{NaBF_4} \begin{array}{c} R_1 \\ \diagdown \\ R_2 \end{array} N^{\oplus}=\overset{OR_2}{\underset{|}{C}} \quad BF_4^{\ominus} + NaCl$$

wherein, $R_1$, $R_2$ and $R_3$ are meanings the same meanings as above.

In the following paragraphs, the present invention will be illustrated in more detail by way of example.

EXAMPLE 1

To 21.93 g (1 mole) of DMF, there is added 31.18 g (1.05 moles) of ethyl chlorocarbonate in a non-hygroscopic atmosphere while being ice-cooled and stirred, and the stirring is continued for another 30 minutes. The mixture thus obtained, after there being added 32.94 g (1 mole) of sodium fluoroborate and stirred for another 30 minutes under cooling and further at room temperature, developed heat with the evolution of carbon dioxide. Thereafter, it was allowed to react for 2 hours at 30±2° C. After the reaction was completed and the precipitated sodium chloride was removed by filtration, the vessel and the sodium chloride layer were washed with acetone which was then removed by evaporation under reduced pressure. The filtrate was combined with a colorless oily substance obtained from the washings and the mixture was washed with anhydrous ether three times. Drying of the oily substance under reduced pressure afforded colorless oil, dimethylaminoethoxycarbonium fluoroborate, (48.58 g, 85.7 percent).

$IR\nu_{max}^{film}$ cm$^{-1}$:
1710 ($>C=N^+<$)

NMR ($d_6$–DMSO) $\tau$value:
8.62 (3H,$t$., $J$=7 c.p.s.),
6.88, 6.70 (2×3H, 2×$d$, $J$=1 c.p.s.), 5.38 (2H,$q$, $J$=7 c.p.s.), 1.25 (1H, Sept., $J$=1 c.p.s.)

The product was identified with the dimethylaminoethoxycarbonium fluoroborate synthesized by Meerwein Method Ann., 641, 1, (1961)) by comparing their infrared and NMR spectra.

EXAMPLE 2

The dimethylaminoethoxycarbonium fluoroborate (48.58 g) obtained by the method of Example 1, was added dropwise to the ethylate solution prepared from 6.5 g of sodium and 170 ml of anhydrous ethanol for about 1 hour while being cooled intensely with a freezing mixture and stirred vigorously. After standing overnight at room temperature, the mixture was freed of the excess alcoholate and inorganic salt by distilling the alcohol and the formed amideacetal under reduced pressure while being cooled with dry-ice/acetone. Rectification of the distilled alcohol solution with Widmer's fractionater afforded 23.47 g (63.03 percent) of dimethylformamide diethylacetal as a fraction of b.p.$_{760}$ 135–6° C.

$IR\nu_{max}^{film}$ cm$^{-1}$:
1670, 1050

NMR (CODl$_3$) $\tau$value: 8.80 (6H,$t$, $J$=7 c.p.s.), 7.70(6H,S ,6.42(4H,$g$., $J$=7c.p.s.), 5.47 (1H,S).

EXAMPLE 3

A mixture containing dimethylaminoethoxycarbonium fluoroborate was obtained by a similar reaction to that described in Example 1, wherein 21.93 g of DMF, 34.18 g of ethyl chlorocarbonate and 32.94 g of sodium fluoroborate are employed. This mixture, also containing precipitated sodium chloride, was added, in a manner similar to that described in Example 2, to an alcoholate solution prepared by combining 200 ml of anhydrous ethanol and 7.59 g of sodium. Reaction and after-treatment of the mixture in a manner similar to that described in Example 2 afforded 23.49 g (53.2 percent) of the product as a fraction of b.p.$_{760}$ 135–6° C.

The product is a colorless liquid with amine like smell and was identified as dimethylformamidediethylacetal by comparing the infrared and NMR spectra.

We claim:

1. A process for preparing a compound of the formula

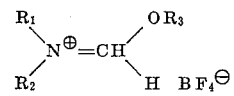

wherein $R_1$, $R_2$ and $R_3$ each represents a lower alkyl group, which comprises mixing a dialkylformamide and alkyl chlorocarbonate and reacting the mixture with sodium fluoroborate at a temperature of 0° – 30° C for a period of time less than 2 hours.

2. The process as claimed in claim 1, wherein dimethylformamide is used as the dialkylformamide.

3. The process as claimed in claim 1, wherein ethyl chlorocarbonate is used as the alkyl chlorocarbonate.

* * * * *